(12) United States Patent
Coppola et al.

(10) Patent No.: US 7,815,056 B2
(45) Date of Patent: Oct. 19, 2010

(54) SUPPORT APPARATUS TO MAINTAIN PHYSICAL GEOMETRY OF SHEET GLASS AND METHODS OF USING SAME

(75) Inventors: Frank Thomas Coppola, Elmira, NY (US); Monica Jo Mashewske, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 430 days.

(21) Appl. No.: 11/801,002

(22) Filed: May 8, 2007

(65) Prior Publication Data

US 2008/0276647 A1 Nov. 13, 2008

(51) Int. Cl.
*C03C 23/00* (2006.01)
*F27B 9/00* (2006.01)
(52) U.S. Cl. .............. 211/41.14; 211/41.18; 432/121; 432/253; 432/258; 432/259; 432/261; 65/111
(58) Field of Classification Search ............ 211/41.14, 211/41.18; 432/121, 253, 258, 259, 261
See application file for complete search history.

(56) References Cited

U.S. PATENT DOCUMENTS

| 2,919,022 | A | * | 12/1959 | Lidgard | 206/448 |
| 3,002,321 | A | * | 10/1961 | Dunipace et al. | 65/119 |
| 3,147,860 | A | | 9/1964 | Kean, Sr. et al. | 206/62 |
| 4,778,064 | A | * | 10/1988 | Gold | 211/41.14 |
| 2004/0200788 | A1 | * | 10/2004 | Shon et al. | 211/41.18 |
| 2005/0193772 | A1 | * | 9/2005 | Davidson | 65/111 |

FOREIGN PATENT DOCUMENTS

| JP | 00/191067 | 7/2000 | ................. 85/48 |
| JP | 2000191067 A | * 7/2000 | |

* cited by examiner

*Primary Examiner*—Khanh Nguyen
*Assistant Examiner*—Carson Gross

(57) ABSTRACT

Disclosed are devices and methods for supporting glass sheets during a thermal treatment process, such as heat treating, to maintain the physical geometry of the glass sheets. The device can comprise means for separating adjacent glass sheets to prevent them from touching. The separating means can comprise a separation comb having projections and channels configured for receiving the glass sheets, separating rods configured to be positioned between the glass sheets, or a combination of separation combs and separating rods.

15 Claims, 15 Drawing Sheets

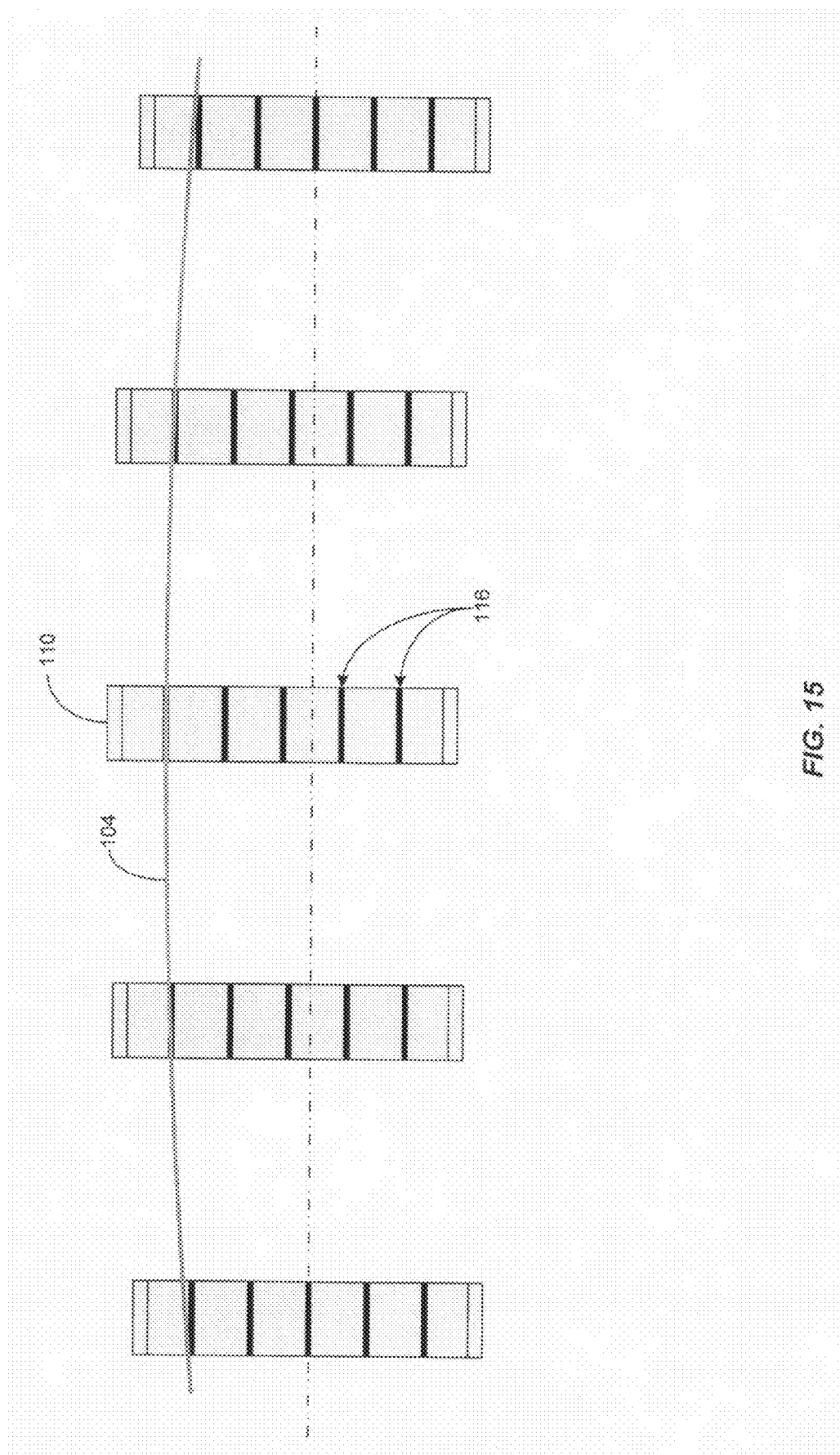

SUPPORT APPARATUS TO MAINTAIN PHYSICAL GEOMETRY OF SHEET GLASS AND METHODS OF USING SAME

FIELD OF THE INVENTION

The present invention relates to devices and methods for supporting glass sheets during a thermal treatment process. More specifically, devices and methods are provided for separating adjacent glass sheets to prevent same from touching and for supporting the glass sheets to maintain the physical geometries of same during a heat treating process.

TECHNICAL BACKGROUND

Manufacturers of glass sheets (e.g., liquid crystal display, or "LCD", glass sheets) often heat treat the glass sheets to pre-shrink or compact the glass prior to shipping. Pre-shrinking or compacting glass sheets can be performed at various temperatures that are typically below the glass sheet strain point. Compaction or densification is performed to minimize dimensional changes of the glass during the customer's processing of the glass sheets.

As an example, a glass sheet can be heat treated at 650° C. for a limited period of time (such as approximately one hour) without having an impact on the glass sheet's physical attribute specifications, such as flatness and surface quality. A product that utilizes this process is the Polysilicon Liquid Crystal Display (P-si LCD) device that is used in high-resolution applications. The LCD glass is exposed to relatively high temperatures (e.g., greater than 500° C.) during the manufacturing process. If the glass sheets are not pre-shrunk, the sheets can undergo contour changes that may negatively affect the finished display quality. Pre-shrinking must be performed without creating glass chips that can contaminate the glass surfaces or distort the glass sheet surfaces through spatially non-uniform heating and/or cooling patterns.

Conventionally, a "closed cassette" is used to support glass sheets during heat treatment, such as described in U.S. Patent Publication No. 2005/0193772. An "open" or "standard" cassette is also utilized in some applications. In a closed cassette support method, multiple glass sheets are held in a vertical orientation within enclosed sections of a cassette. The glass sheets are supported with horizontal and vertical supports (such as those made of stainless steel). In practice, the glass sheet is supported around the perimeter so as to maintain the physical attributes such as warp and surface quality. The glass sheet is typically captured along the full length of all four sides.

In an open cassette support method, multiple glass sheets are held in a vertical orientation within a cassette. The glass sheet is supported on the two sides and bottom side with vertical and horizontal supports, respectively. As in the closed cassette support method, the glass sheet is supported around the perimeter to maintain its physical attributes. Both the open and closed cassette methods generally minimize the gravity effect on the glass during heat treatment.

In both the closed and open cassette support designs, the glass sheets are contacted along substantially all of at least three edges. This contact often causes sheet damage or loss. The full-contact supports also have an impact on the thermal characteristics of the system. As may be appreciated, the metal mass concentration along each edge impacts the temperature profile at the edges due to the heat having to travel through metal before reaching the glass along the edges and corners. Additionally, in both support designs, debris (including glass particles and chips) builds up in the bottom-edge support that is very difficult to clean out; as a result, these support designs can cause significant bottom-plate debris contamination of glass sheets.

Both of the aforementioned support designs are manufactured by bending and forming sheet material (such as stainless steel) into the required assembly. By nature, these procedures are not precise, difficult to produce, and costly to manufacture.

Thus, there is a need in the art for systems and methods for supporting glass sheets during heat treatment that maintain the physical geometry and attributes of the glass sheets while minimizing debris contamination and extreme temperature gradients along the edges of the glass sheets.

SUMMARY OF THE INVENTION

The present invention provides devices and methods for supporting a plurality of glass sheets. In one aspect, a device is provided comprising a support frame and means for separating each of the plurality of glass sheets to prevent adjacent sheets from touching. In a further aspect, the means for separating comprises a separation comb comprising a comb base defining a longitudinal axis and a plurality of projections that are spaced apart along the comb base and project outwardly therefrom. Adjacent projections, in one aspect, define a channel therebetween that is configured to receive a portion of a respective glass sheet, such as a portion of an edge of the glass sheet.

In another aspect, the means for separating comprises at least one separating rod configured to be positioned between adjacent glass sheets in a direction substantially parallel to a plane defined by each of the glass sheets. In a further aspect, the separating rod is configured to be positioned proximate an edge of each of the glass sheets. The device can further comprise means for supporting the separating rod.

In yet another aspect, the means for separating comprises at least one separation comb and at least one separating rod. In such aspect, it is contemplated that respective first edges of the glass sheets can be separated by at least one separation comb and second edges of the glass sheets can be separated by at least one separating rod.

In one embodiment, a method is provided for heat treating a plurality of glass sheets. The exemplary method, in one aspect, comprises placing the plurality of glass sheets within a device comprising a support frame and means for separating each of the glass sheets. The method further comprises positioning the means for separating along an edge of each of the glass sheets, placing the device into the oven, and operating the oven to heat the glass sheets.

Additional embodiments of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed and/or as claimed.

BRIEF DESCRIPTION OF THE DRAWINGS

These and other features of the preferred embodiments of the invention will become more apparent in the detailed description in which reference is made to the appended drawings wherein:

FIG. 15 is a schematic diagram showing a plan view of an arcuate array of a plurality of separation combs, according to yet another aspect of the present invention.

DETAILED DESCRIPTION

Figure 1:
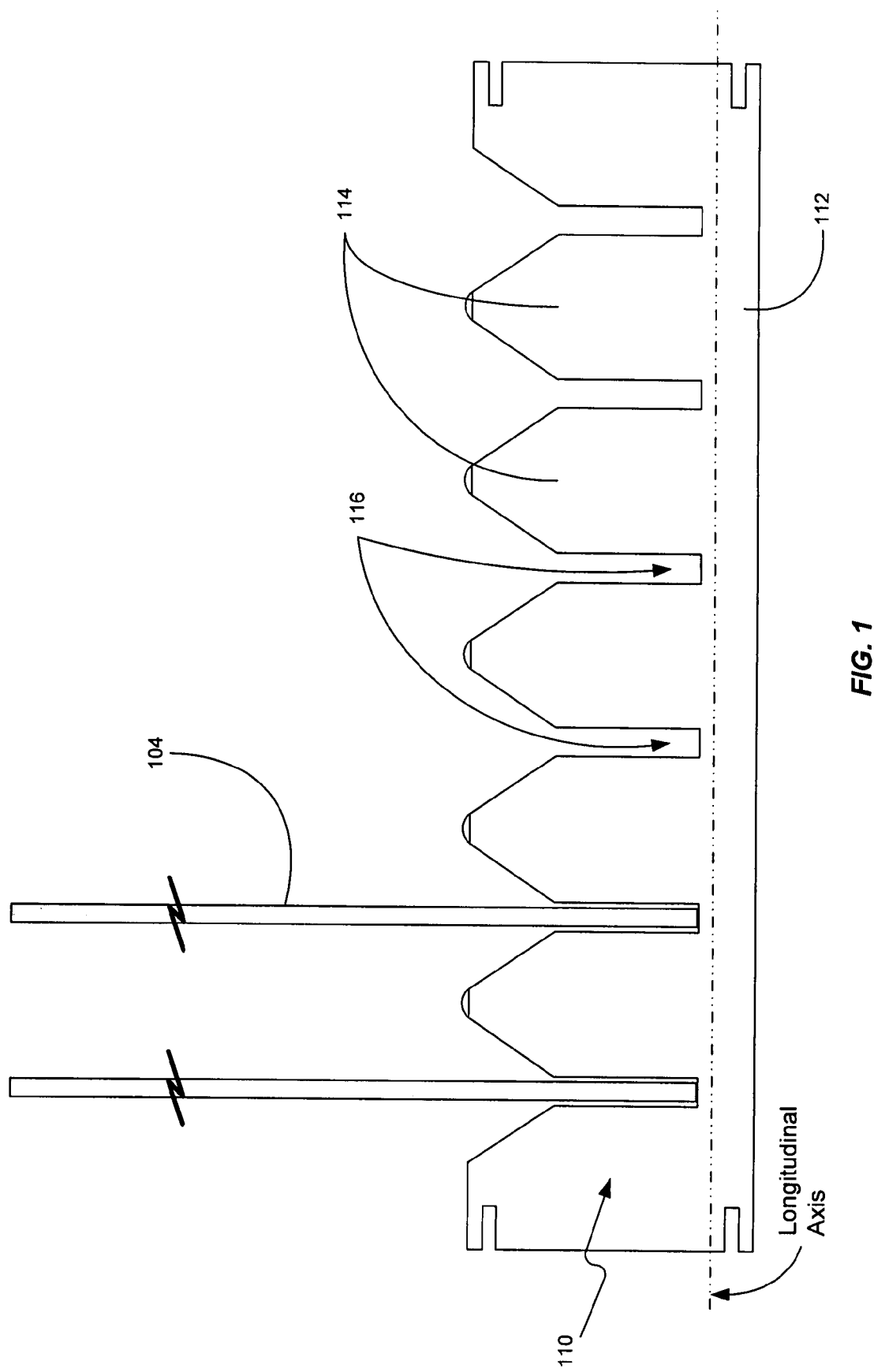
FIG. 1 is a schematic diagram showing a side view of a device for supporting glass sheets, according to one aspect of the present invention.

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a separation comb includes embodiments having two or more such separation combs unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

As briefly summarized above, in various embodiments, the present invention provides devices and methods for supporting a plurality of glass sheets during a thermal treatment process, such as heat treating. In one aspect of the present invention, a device is provided for supporting a plurality of glass sheets. As may be appreciated, a glass sheet according to various aspects of the present invention can comprise one or more edges. For example, a glass sheet can be provided that has four edges and a generally square, rectangular, trapezoidal, parallelogram or other shape. Optionally, a substantially round, oblong, or elliptical glass sheet can be provided that has one continuous edge. Other glass sheets having two, three, five, etc. edges can also be provided and are contemplated as being within the scope of the present invention. Glass sheets of various sizes, including varying lengths, heights, and thicknesses, are also contemplated within the scope of the invention.

A device, in one aspect, comprises means for separating each of a plurality of glass sheets to prevent adjacent sheets from touching. For example, as shown in FIG. 1, a separation comb 110 can be provided that comprises a comb base 112 defining a longitudinal axis. A plurality of projections 114 spaced apart along the comb base can project outwardly from the comb base. In one aspect, the projections project outwardly in a direction substantially transverse to the longitudinal axis of the comb base. As can be seen in FIG. 1, adjacent projections can be spaced to define a channel 116 therebetween. Each channel can be configured to receive a portion of a respective glass sheet 104, such as a first edge. In a particular aspect, each channel is at least as wide as a thickness of a glass sheet. Thus, in one aspect, the selected width of the channel can vary depending on the particular thickness of the glass sheet to be supported therein. As may be appreciated, each channel can be configured to separate a glass sheet from adjacent glass sheets, as well as supporting a respective edge or portion of the glass sheet.

In one aspect, each projection 114 of a separation comb can have a distal portion comprising sloped edges, such as shown in FIG. 1. As each glass sheet is inserted into the separation comb, the sloped edges can be used to guide each glass sheet into a respective channel. In various aspects, a projection can be of any shape. For example, with reference to FIG. 3, in one aspect a separation comb 210 is provided that has substantially "T" shaped projections 214. The proximal ends of the projections can be spaced apart at a first distance, $d_1$, and the distal ends of the projections can be spaced apart at a second distance, $d_2$. In a particular aspect, the second distance is at least as wide as the thickness of each sheet of glass. As described above, this distance can be selected depending on the particular thickness of the glass sheet to be received within the respective channel 216. In this manner, the projections can be shaped so that an edge of the glass sheet received by the channel, such as edge 106b, is not contacted by the separation comb when the respective glass sheet is supported by the separation comb 210.

Projections having other shapes are contemplated within the scope of the present invention, including projections that are configured to separate glass sheets but minimize or eliminate contact with the edge that is positioned within a channel between adjacent projections. For example, each projection can have sides that extend between the proximal and distal portions of the projection and that are concave relative to a respective channel. Thus, in one example, each channel can be substantially football shaped.

Figure 2:
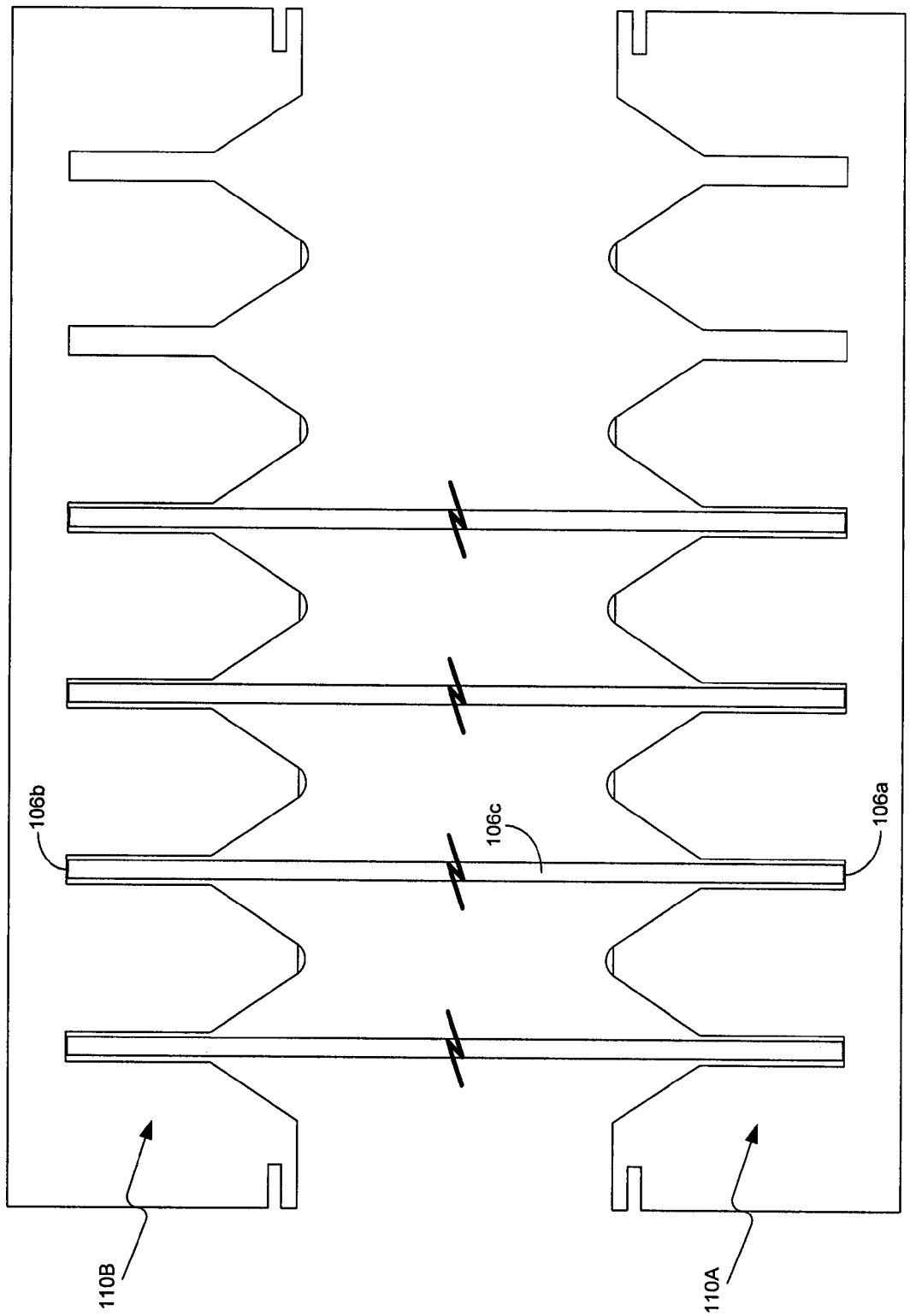
FIG. 2 is a schematic diagram showing a side view of a device for supporting glass sheets, according to another aspect of the present invention.

In one aspect, two or more separation combs can be provided for separating one or more glass sheets. For example, as shown in FIG. 2, two or more separation combs 110 comprising sloped-end projections can be used to separate glass sheets. A first separation comb 110A can be positioned to receive and separate first edge 106a of glass sheets, and a second separation comb 110B can be positioned to receive and separate opposing second edges 106b of the glass sheets. In one aspect, the first edges can be bottom edges and the second edges can be top edges, although it is contemplated that the first and second edges can be any edges of the glass sheets. One or more separation combs can also be provided to separate the glass sheets at third 106c and/or fourth edges of the glass sheets, such as side edges. The two or more separation combs can be provided to separate the glass sheets at any combination of edges, such as top and bottom edges, top and side edges, bottom and side edges, both side edges, or all edges, in the case of glass sheets comprising four edges. Additionally, two or more separation combs can be provided to separate the glass sheets along a single edge of each respective glass sheet. For example, a plurality of separation combs can be provided to separate a bottom, top, or side edge of the glass sheets. Additional separation combs can be provided to support other edges, such that each of a plurality of edges is separated by a plurality of separation combs.

Figure 3:
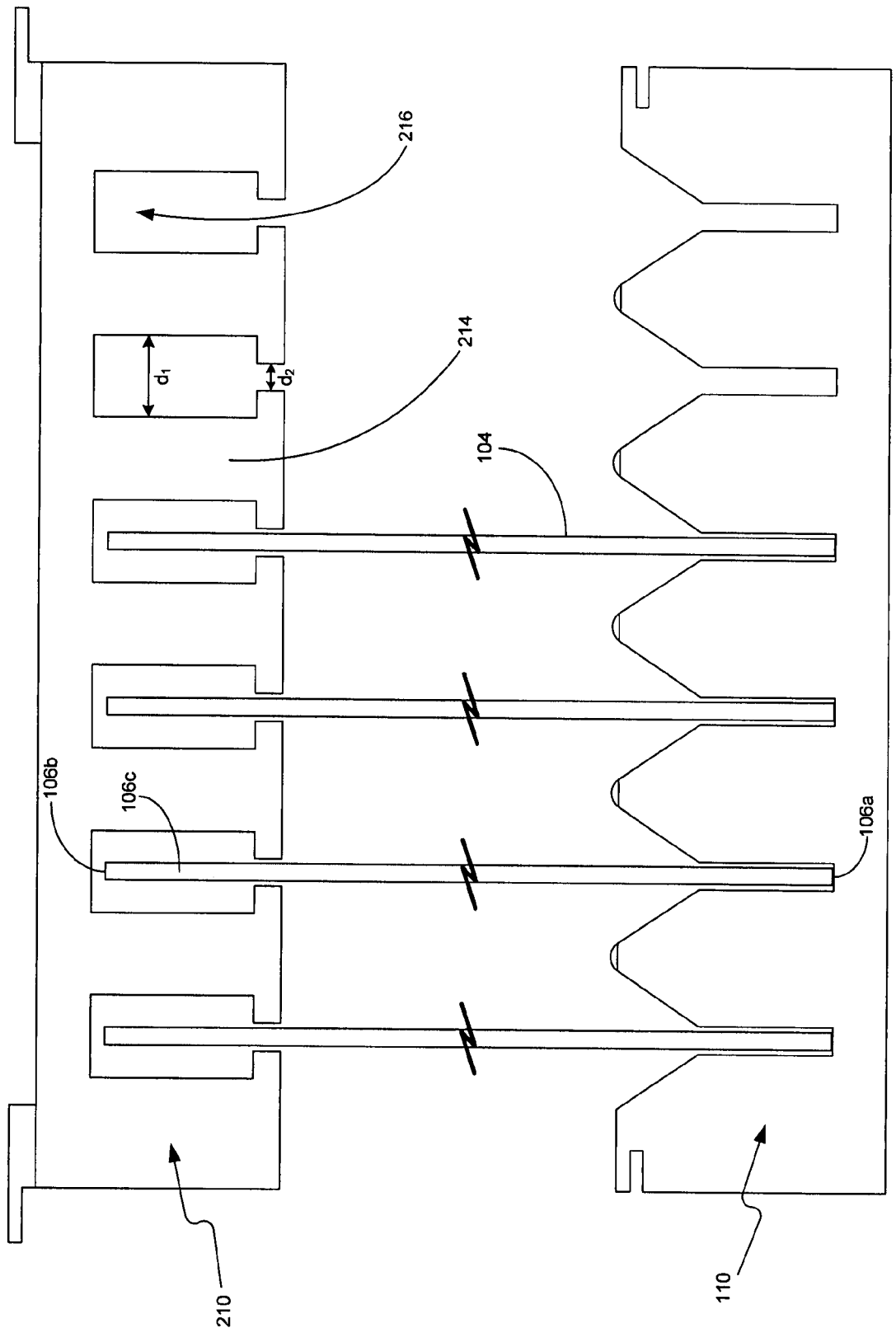
FIG. 3 is a schematic diagram showing a side view of a device for supporting glass sheets, according to yet another aspect of the present invention.
Figure 4:
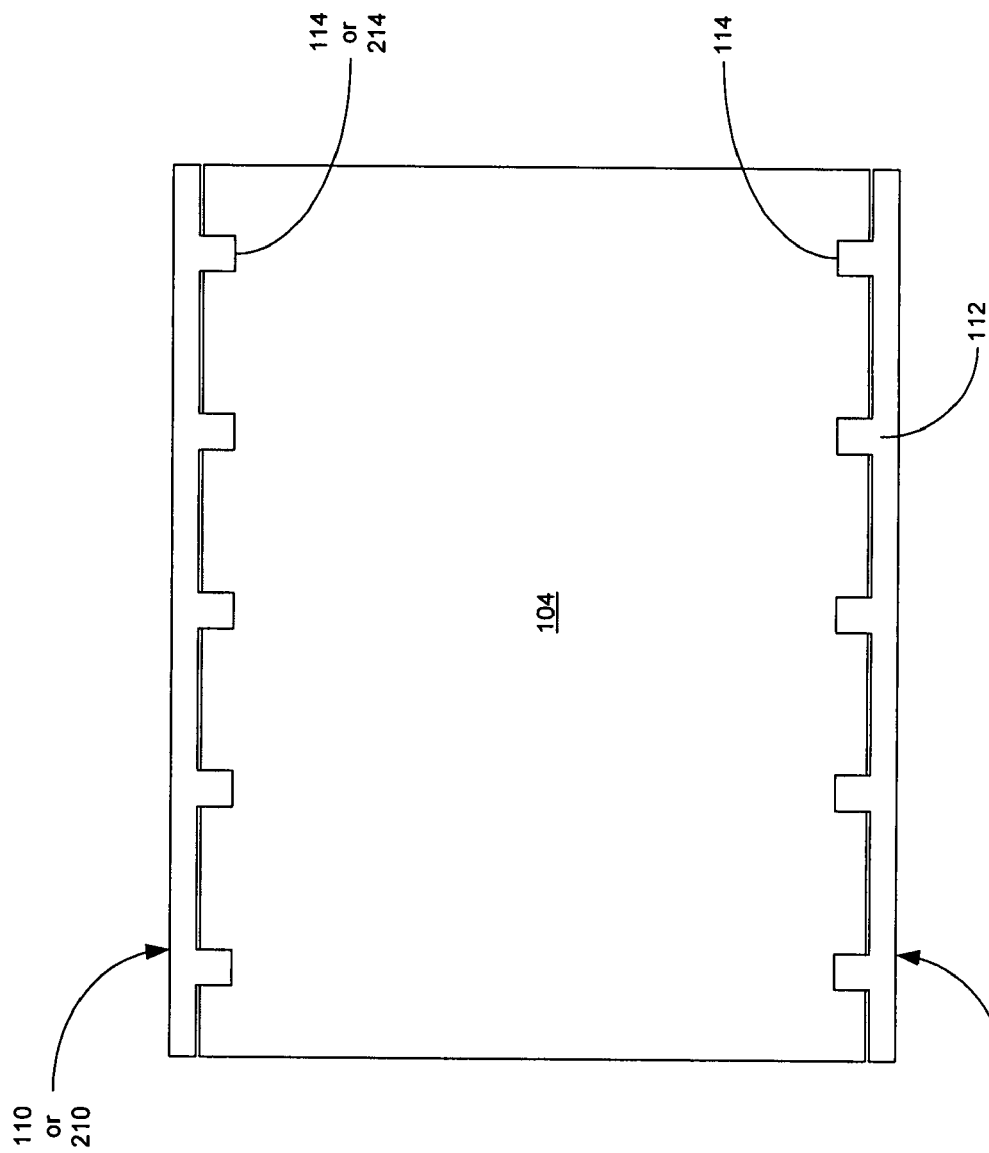
FIG. 4 is a schematic diagram showing a front view of a device for supporting glass sheets, such as shown in any of FIG. 1, 2 or 3, according to one aspect of the present invention.

As shown in FIG. 3, in some aspects, a first separation comb 110 comprising sloped-end projections can be provided to separate a glass sheet from adjacent glass sheets along one edge 106a. A second separation comb 210 comprising "T" shaped projections can be provided to separate the glass sheet from other glass sheets along another edge 106b. As described above, such separation combs can be provided in any combination, in any number, and can separate a plurality of glass sheets along any or all of the edges of the glass sheets. FIG. 4 illustrates a front view of a glass sheet that is supported by two separation combs along the top and bottom edges of the glass sheet, such as shown in FIG. 2 or 3.

Figure 5:
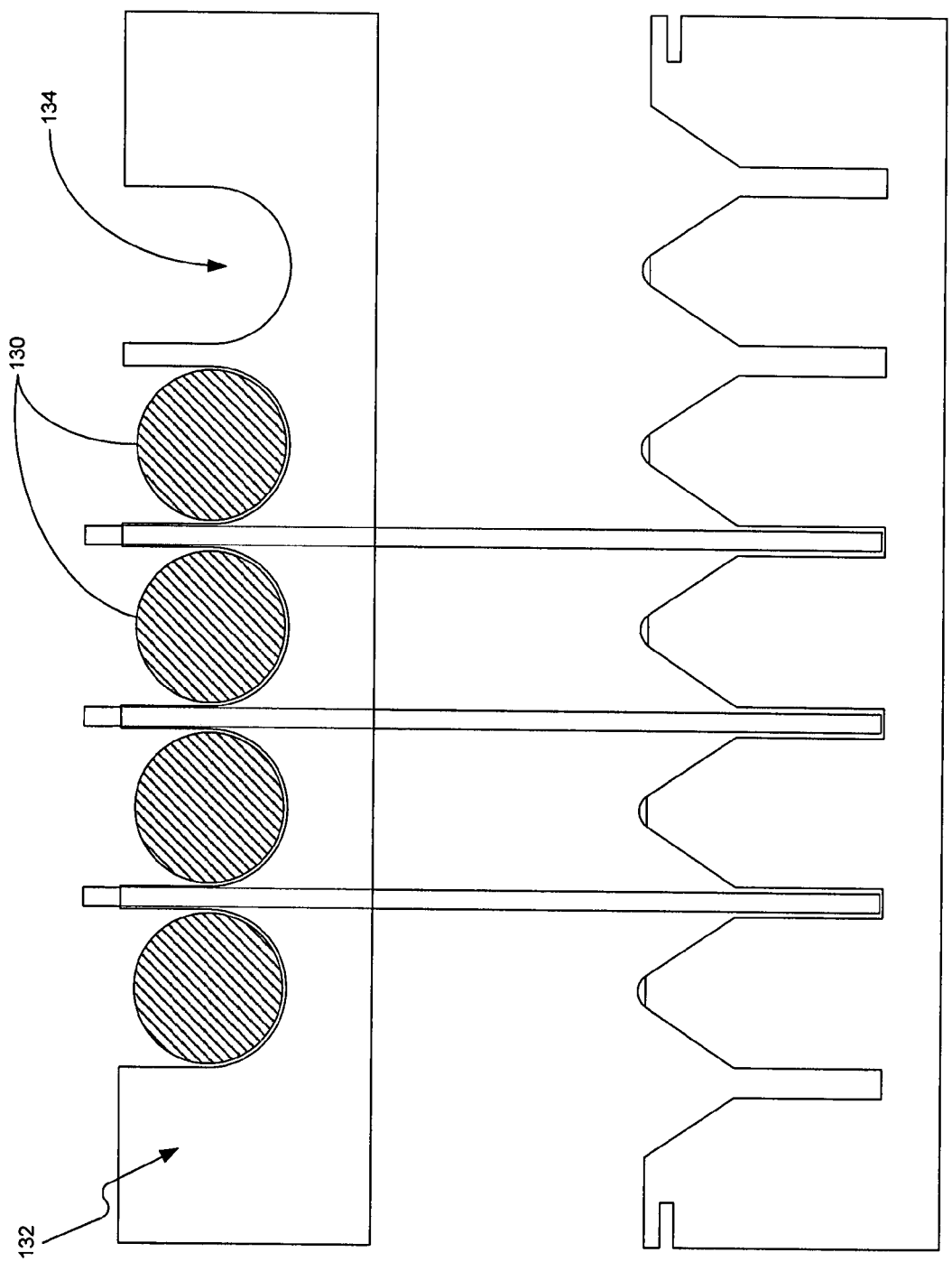
FIG. 5 is a schematic diagram showing a side view of a device for supporting glass sheets, according to another aspect of the present invention.
Figure 6:
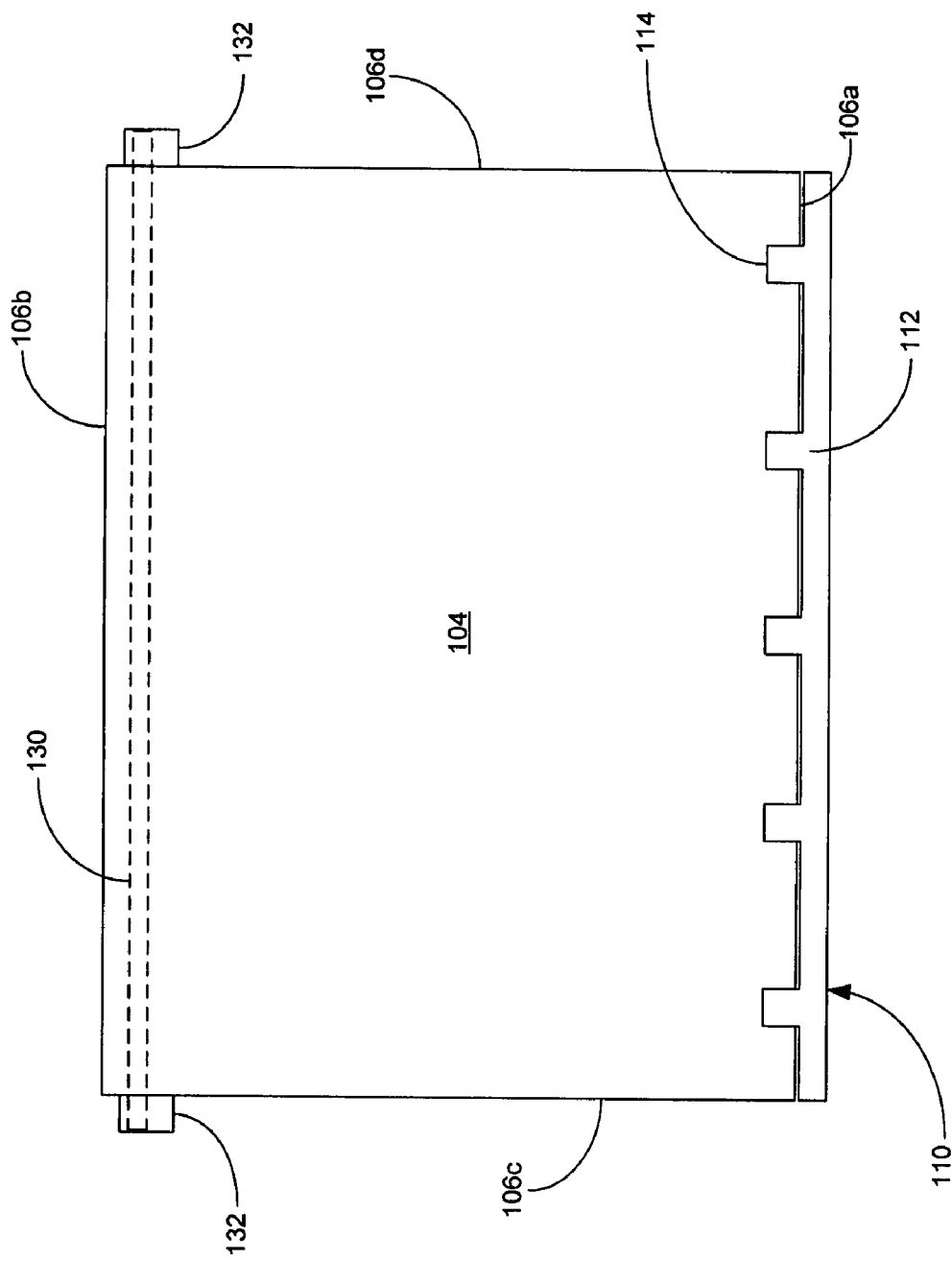
FIG. 6 is a schematic diagram showing a front view of a device for supporting glass sheets, such as shown in FIG. 5, according to one aspect of the present invention.

In another aspect, other means can be provided for separating a plurality of glass sheets. For example, as shown in FIGS. 5 and 6, one or more elongate separating rods 130 can be provided to separate the glass sheets. As may be appreciated, each separating rod can have a proximal portion and an opposing distal portion. In one aspect, each separating rod is configured to be positioned between at least two adjacent glass sheets in a direction substantially parallel to a plane defined by each of the glass sheets. The separating rods can be positioned proximate an edge of respective adjacent glass sheets, such as a top, bottom, or side edge.

In a further aspect, means can be provided for supporting the at least one separating rod. As shown in FIG. 5, for example, a support structure 132 comprising one or more channels 134 can be provided. Each channel can be configured to receive a portion of a respective separating rod. For example, as shown in the front view of FIG. 6, a separating rod can be positioned proximate, and extend substantially parallel to, a first edge 106b of a glass sheet 104. The proximal and distal portions of a separating rod can extend beyond the adjacent second edge 106c and third edge 106d. The proximal portion of the separating rod can be supported by a first support structure and the distal portion of the separating rod can be supported by a second support structure.

Figure 7:
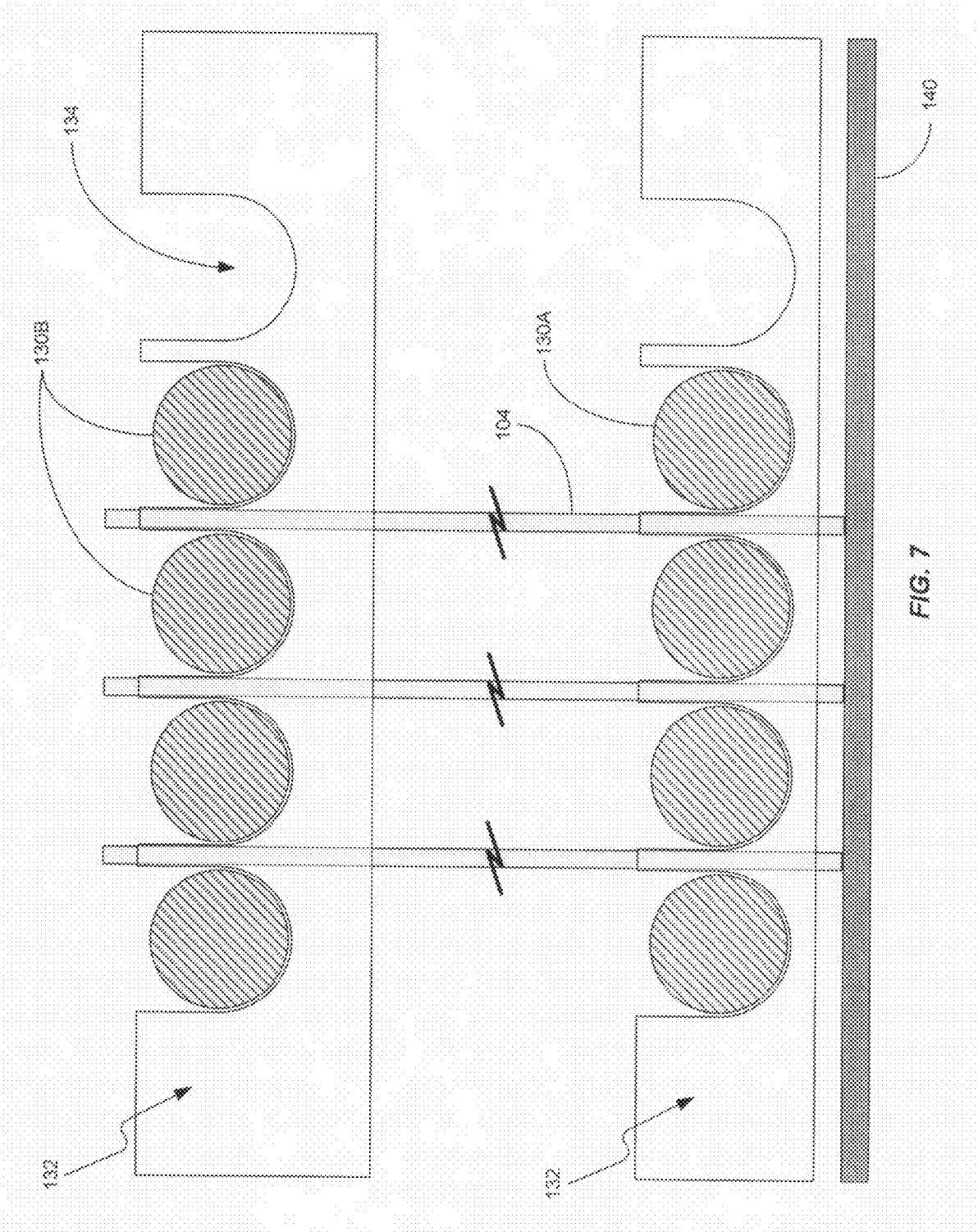
FIG. 7 is a schematic diagram showing a side view of a device for supporting glass sheets, according to another aspect of the present invention.

As illustrated in FIG. 7, in one aspect, a first plurality of separating rods 130A can be provided to separate a plurality of glass sheets proximate respective first edges (such as, but not limited to, bottom edges) of the glass sheets. A second plurality of separating rods 130B can be provided to separate the glass sheets proximate respective second edges (such as, but not limited to, top edges) of the glass sheets. Respective support structures 132 can be provided to support the proximal and distal portions of the first and second series of separating rods.

Figure 9:
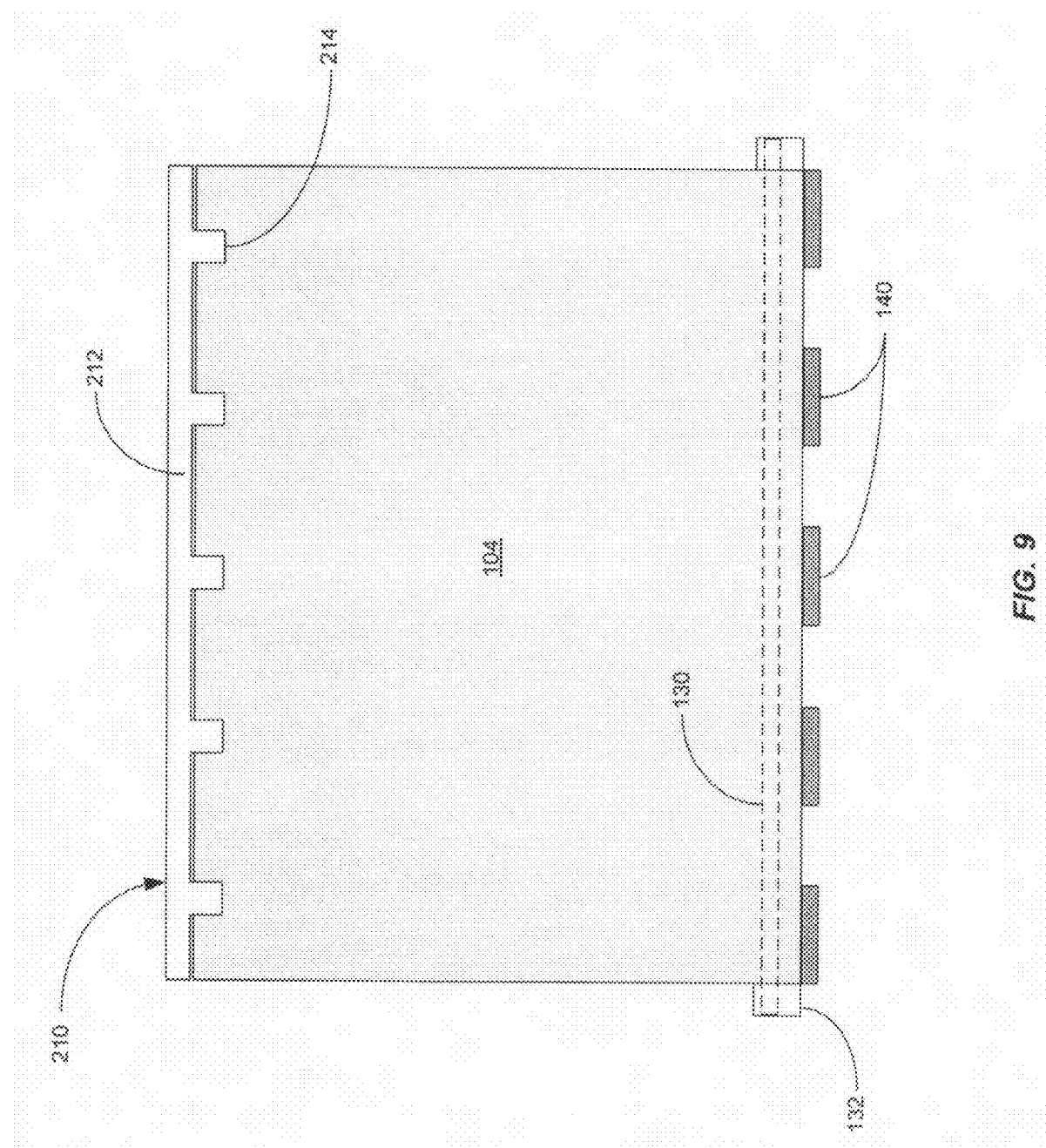
FIG. 9 is a schematic diagram showing a front view of a device for supporting glass sheets, such as shown in FIG. 8, according to one aspect of the present invention.
Figure 10:
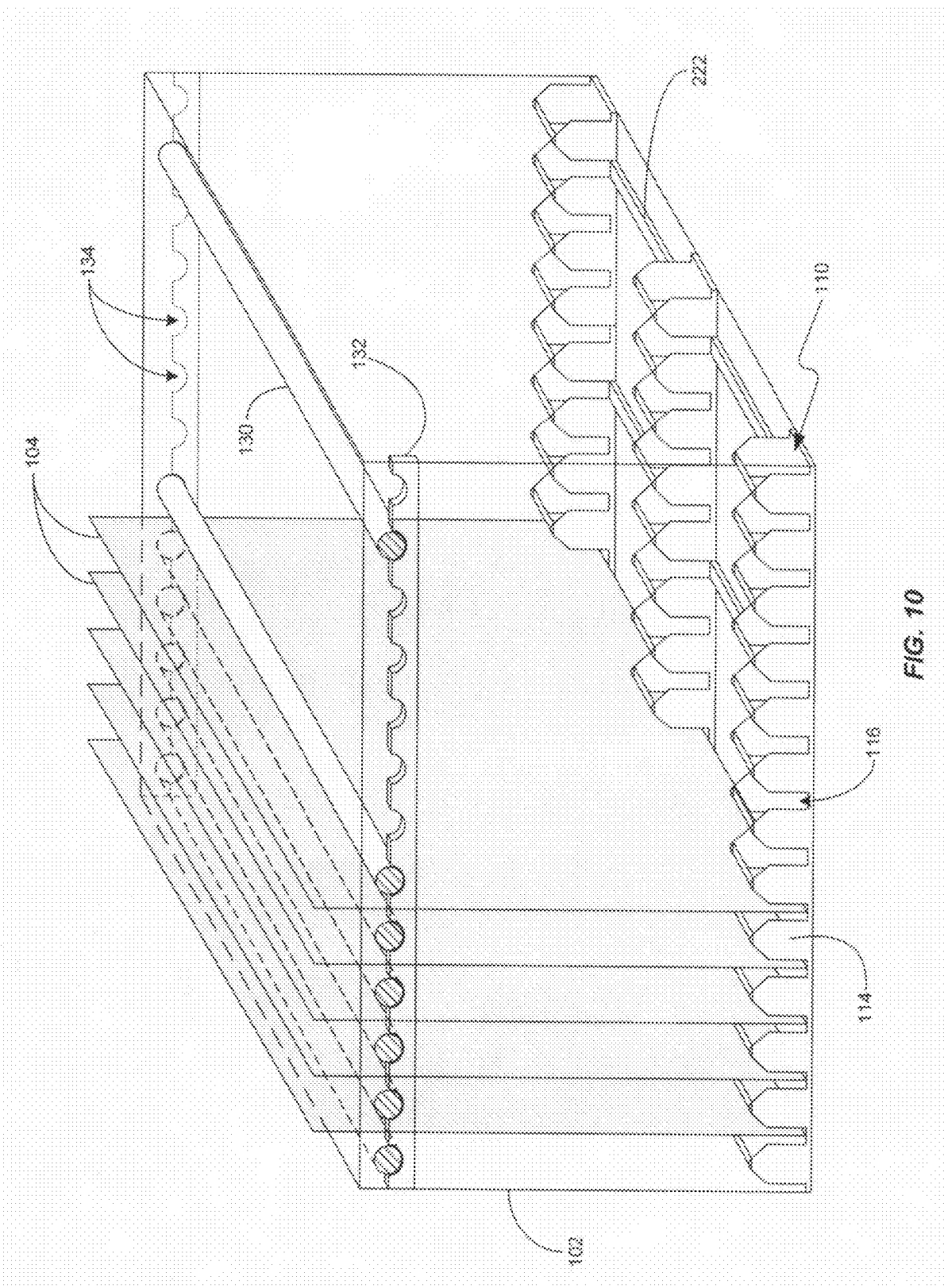
FIG. 10 is a schematic diagram showing a perspective view of a device for supporting glass sheets, according to another aspect of the present invention.

As may be appreciated, several separating rods can be provided and positioned proximate various edges of glass sheets, including top, bottom, side, or other edges. In one aspect, one or more separating rods can be provided to separate the glass sheets proximate respective bottom edges of the glass sheets, such as shown in FIGS. 7, 9 and 10 for example. In this aspect, one or more supporting plates 140 can be provided to support at least a portion of the bottom edges of the glass sheets.

As shown in FIG. 5, a separating rod according to one aspect of the present invention can have a substantially circular cross section. It is contemplated, however, that a separating rod can have a non-circular cross section, such as, for example and without limitation, square, rectangular, elliptical, triangular, oblong, or other non-circular shapes, and the like.

Figure 8:
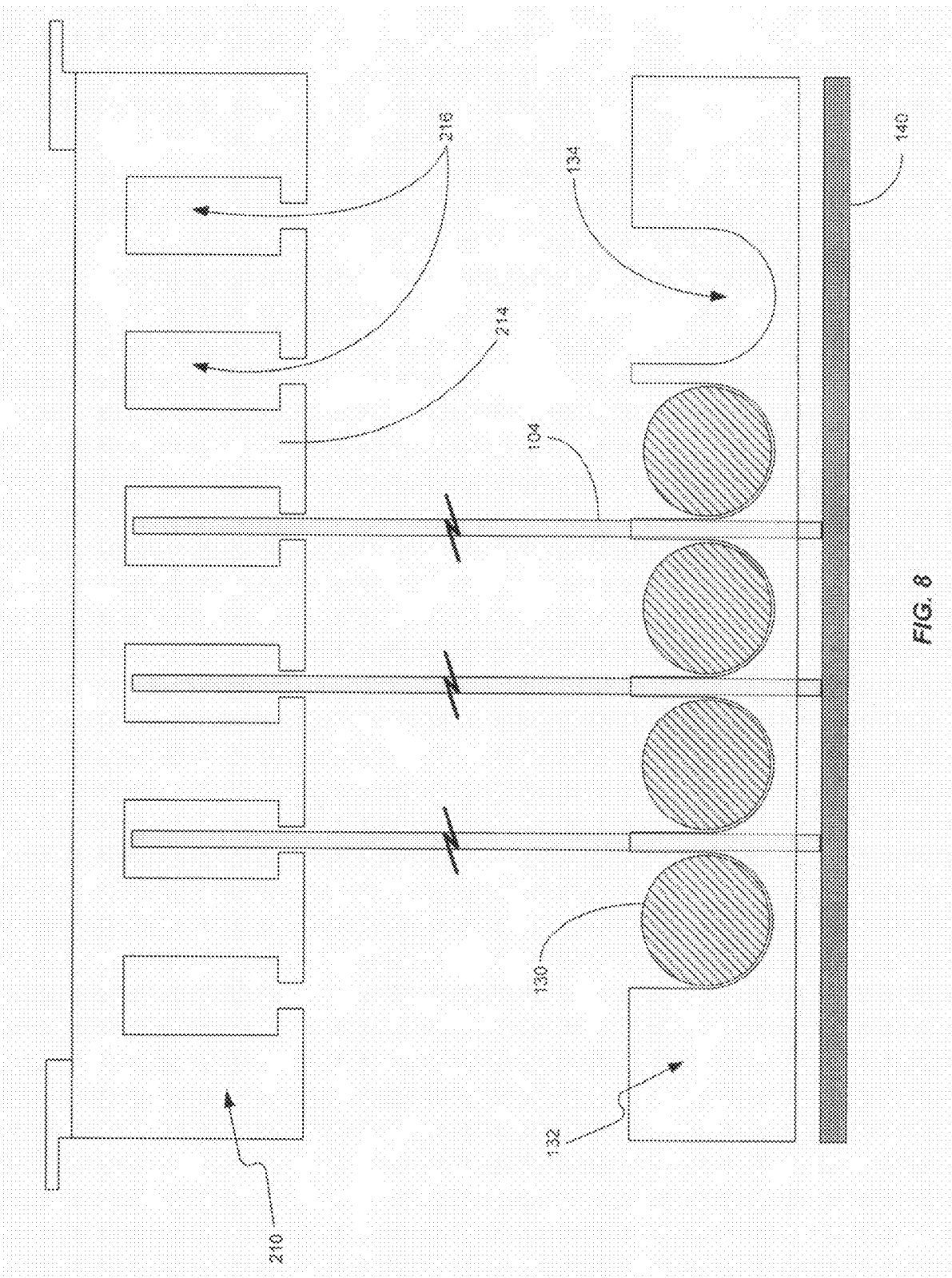
FIG. 8 is a schematic diagram showing a side view of a device for supporting glass sheets, according to yet another aspect of the present invention.

In various aspects, various separating means can be provided to prevent adjacent sheets from touching. As described above, one or more separation combs can be positioned along one or more edges of the glass sheets. Optionally, one or more series of separating rods can be positioned proximate one or more edges of the glass sheets. In yet another aspect, a combination of separation combs and separating rods can be provided. FIG. 5 illustrates an exemplary device comprising at least one separation comb 110 having sloped-end projections and channels for receiving bottom edges of glass sheets. The portion of the glass sheets proximate the top edges are separated by separating rods 130 supported by at least one support structure 132. FIG. 10 is a perspective view of such an exemplary aspect, in which several rows of separation combs are provided to support and separate the bottom edges of the glass sheets. FIG. 8 illustrates another exemplary device comprising at least one separation comb 210 having "T" shaped projections for separating glass sheets proximate their top edges. A plurality of separating rods is provided for separating the glass sheets proximate their bottom edges. The bottom edges can be supported by one or more supporting plates 140. FIG. 9 shows a front view of such an exemplary aspect, in which several supporting plates are provided to support the bottom edges of the glass sheets. As may be appreciated, any combination of separation combs and separating rods can be provided to support any or all edges of glass sheets, and are not intended to be limited to the combinations described above.

Figure 12:
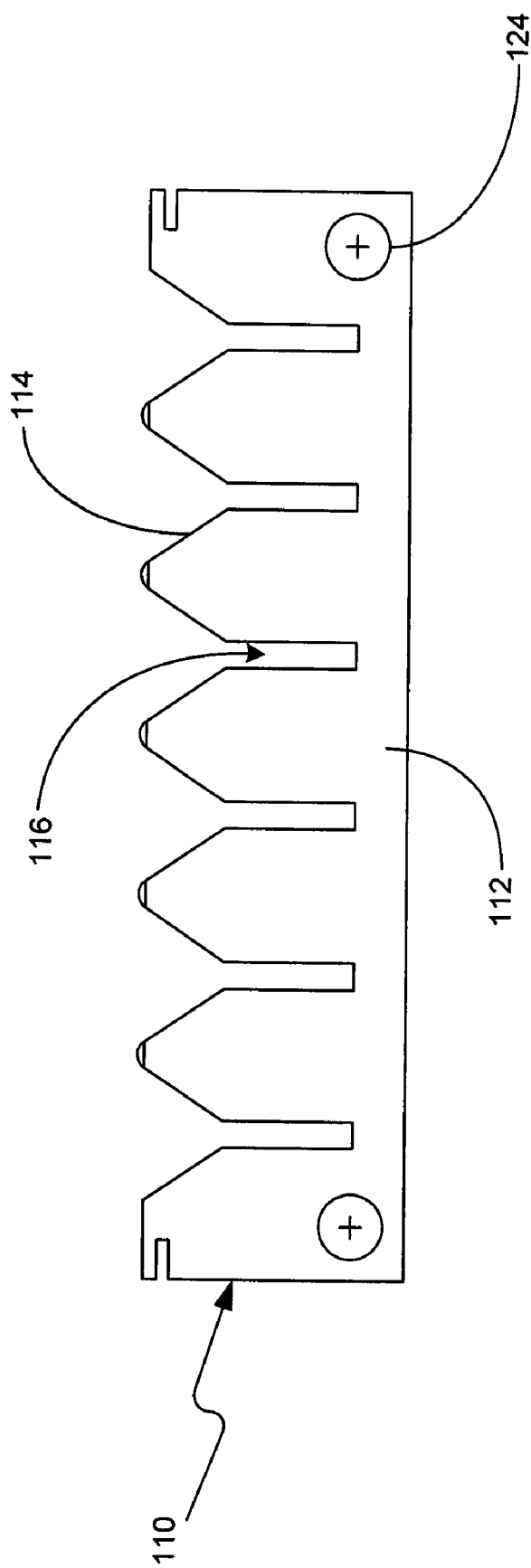
FIG. 12 is a schematic diagram of a separation comb, according to one aspect of the present invention.
Figure 13:
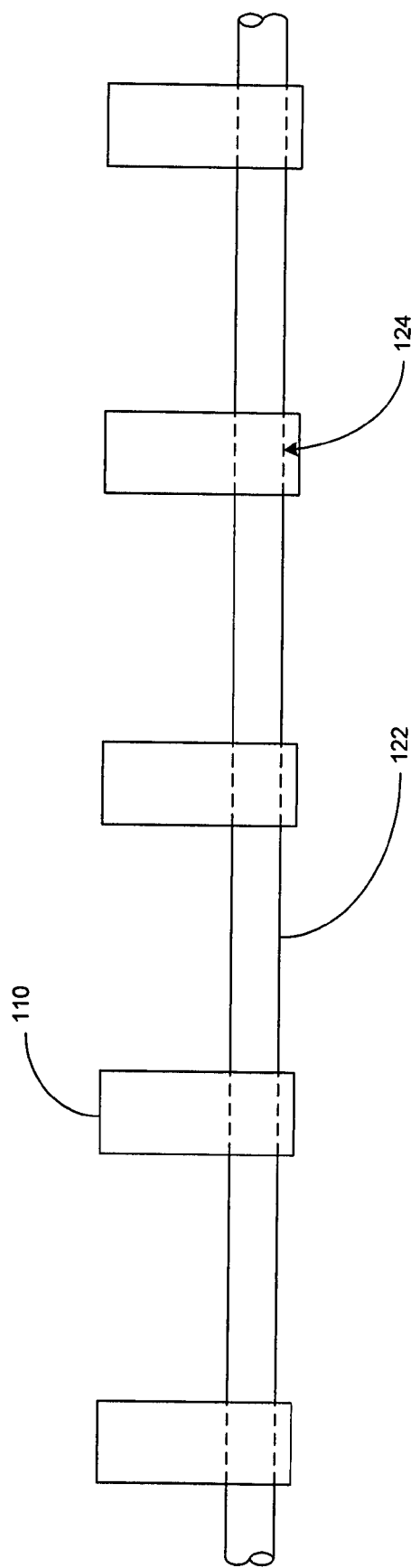
FIG. 13 is a schematic diagram showing a side view of a comb frame, according to one aspect of the present invention.

In one aspect, a plurality of separation combs can be provided and configured to separate a plurality of glass sheets. The plurality of separation combs can be spaced apart from each other along a respective glass edge. In a particular aspect, the separation combs can be positioned so that the longitudinal axes of each comb base are substantially parallel to each other. In a further aspect, the separation combs can be connected to each other via connector means. For example, with reference to FIG. 12, the comb base 112 of a separation comb can define one or more apertures 124 for receiving and/or engaging a respective connector means. FIG. 13 shows a side view of several separation combs connected by a connector rod 122, for example. The connector rod can pass through a corresponding aperture in each adjacent separation comb. Optionally, connector means 222 can be mounted, welded, or otherwise connected to portions of separation combs to connect adjacent separation combs, such as exemplarily shown in FIG. 10.

Figure 14:
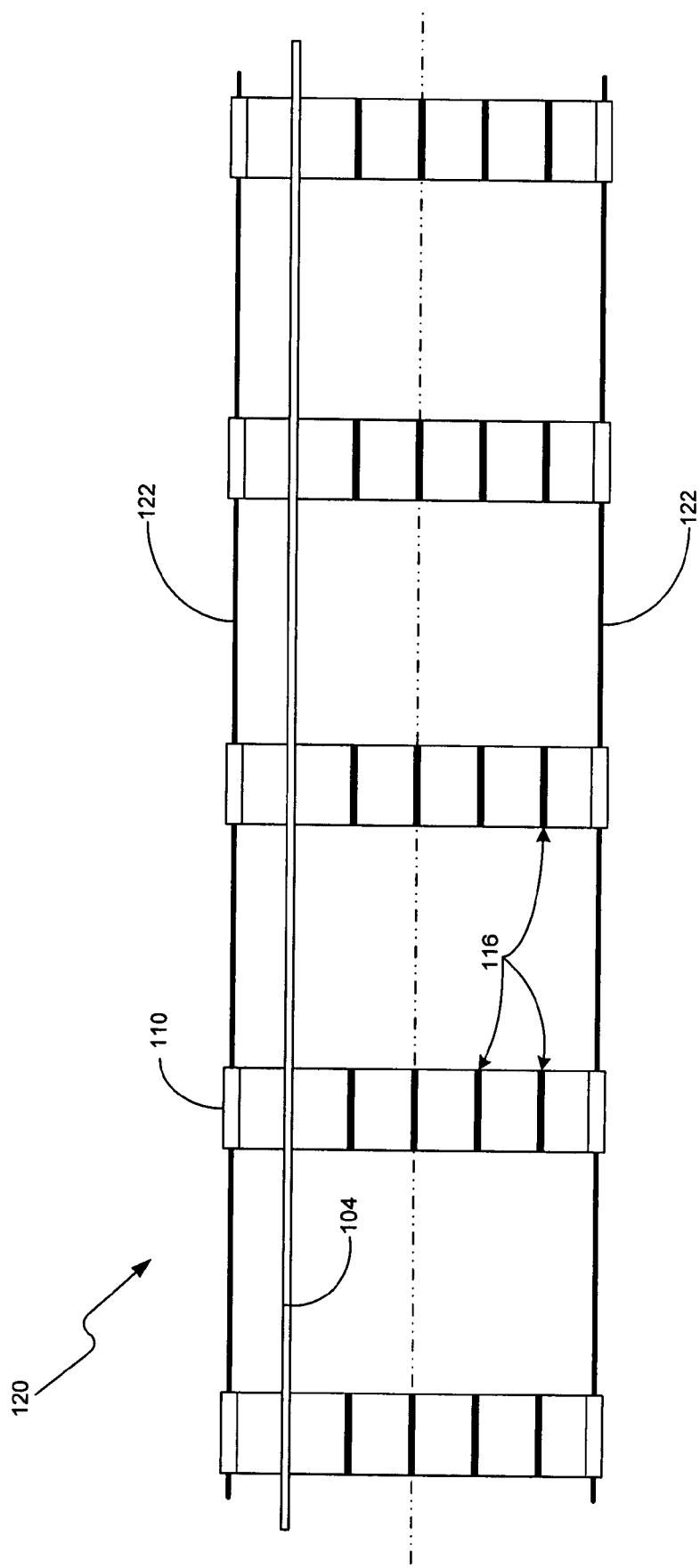
FIG. 14 is a schematic diagram showing a plan view of a linear array of a plurality of separation combs, according to one aspect of the present invention.

In one aspect, several separation combs can be connected via connector means to form a comb frame. FIG. 14 illustrates an exemplary comb frame 120 in which several separation combs are connected with several connector rods 122 to form an array. According to a particular aspect, the separation combs can be connected to form a linear array in which corresponding channels 116 of each of the separation combs lie substantially in a common plane. The common plane can be substantially flat in a direction perpendicular to the longitudinal axis of the separation combs and parallel with an axis defined by the channels. Thus, as can be seen in FIG. 14, a glass sheet 104 can be positioned within corresponding channels of the separation combs and maintain its flat, planar geometry. It is contemplated that the separation combs can be offset from each other to support an edge of the glass that does not have a linear profile (such as, but not limited to, a round edge), while the channels would remain in the common plane. Thus, the edge can be supported at various portions, while the glass sheet maintains its flat, planar geometry.

Optionally, separation combs can be positioned to form a non-linear array, such as an arcuate array in which corresponding channels of each of the separation combs lie in a common arcuate plane. For example, with reference to FIG. 15, the separation combs can be positioned such that the longitudinal axis of each comb base is parallel to each adjacent separation comb, but each channel can be offset from adjacent channels. In this aspect, the separation combs can be positioned in a particular manner to affect the geometry of glass sheets that will be separated by the separation combs. For example, by positioning separation combs in an arcuate array, as shown in FIG. 15, a glass sheet can be formed into an arcuate plane.

According to various aspects, low-expansion materials can be used to manufacture the separating means so that they experience less shape deformation during the thermal treatment (e.g., heating and/or cooling). In one aspect, separating rods can comprise ceramics. Optionally, separating rods can comprise steel. In yet another aspect, separating rods can comprise a non-ferrous metal. Separation combs can be machined from steel, in one aspect. Other materials can be used to manufacture the separating means and are contemplated within the scope of the present invention.

Figure 11:
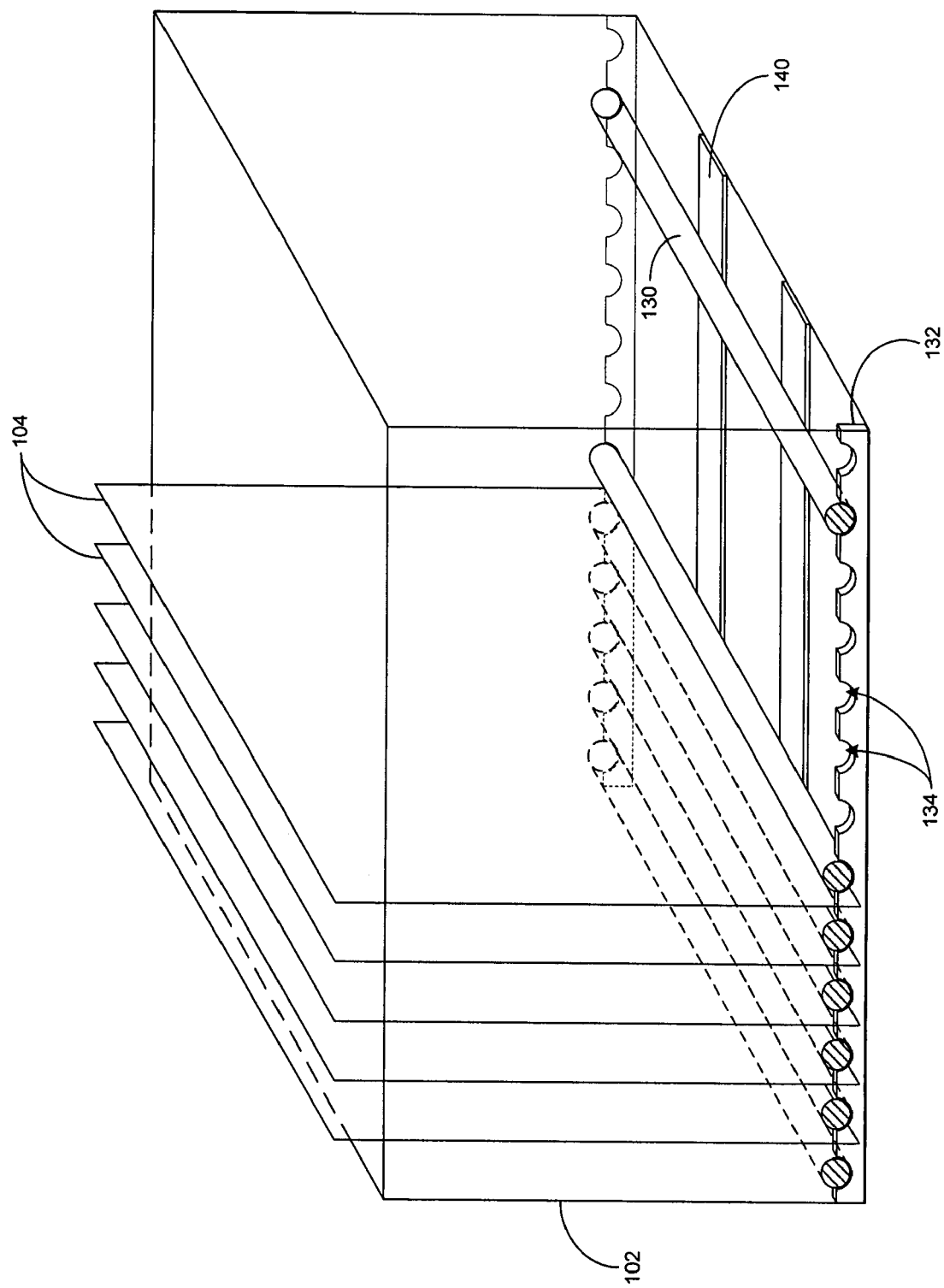
FIG. 11 is a schematic diagram showing a perspective view of a device for supporting glass sheets, according to yet another aspect of the present invention.

In a further aspect, the device can comprise a support frame 102, such as shown for example in FIGS. 10 and 11. The support frame can comprise members that define an open structure. Optionally, the support frame can comprise walls that define a closed structure. The support frame can be constructed from various materials known in the art, such as steel or other metals that can withstand high temperatures without significant deformation. A separation comb can be mounted to or positioned on the support frame. For example, with reference to FIG. 1, the separation comb 110 can comprise notches at either end configured to receive a portion of a support frame. Optionally, such as shown in FIG. 3, a separation comb 210 can comprise projections extending from the comb base that are configured to rest on a portion of a support frame.

It is contemplated that various means of mounting or positioning the separation comb on a support frame is possible and is not intended to be limited to the means illustrated in the Figures. For example, one or more separation combs can be mounted permanently or removably to the support frame. Similarly, a support structure 132 configured for supporting separating rods can be mounted to a portion of the support frame. Optionally, a portion of the support frame can be machined to form the support structure.

Methods for heat treating a plurality of glass sheets are provided according to various aspects of the present invention. In one aspect, a method comprises placing the plurality of glass sheets within a device that comprises means for separating the glass sheets. As described throughout, an exemplary device can comprise one or more separation combs comprising a comb base defining a longitudinal axis, and a plurality of projections spaced apart along the comb base. The projections can be shaped with sloped distal ends, such as those shown in FIG. 1. Optionally, the projections can be substantially "T" shaped, such as shown in FIG. 3. In yet another aspect, the projections can be of any shape, such that adjacent projections define a channel therebetween that is configured to receive a portion of a glass sheet.

The method, according to a further aspect, comprises positioning at least one separation comb along at least one edge of the glass sheets. For example, a glass sheet having four edges can be provided, such as shown in FIG. 4. A separation comb can be positioned along a top, bottom, or side edge, or a combination of two or more such edges. In one aspect, a separation comb comprising sloped-end projections can be provided. In this aspect, positioning the separation comb along an edge of the glass sheets can comprise sliding each glass sheet into a respective channel. As described above, the sloped projections can help to guide the glass sheet into the respective channel. Optionally, a separation comb 210 comprising "T" shaped projections can be provided. In this aspect, the separation comb can be configured to separate the glass sheets proximate a first edge. The glass sheets can slide into the channels 216 from the side of separation comb such that the first edge is not contacted by the separation comb upon insertion. For instance, in some applications it can be important to avoid substantial contact with the edges of the glass sheet to avoid causing chips, cracks, or other surface imperfections or particles that can affect the quality of the glass sheet.

The method can also comprise positioning additional separation combs along one or more additional edges of the glass sheets. The separation combs can be positioned at a spaced distance from each other such that less than all of the edge of the glass sheet is supported by the separation combs. In this aspect, there can be less of an impact on the thermal profile of the glass sheet proximate the edges as compared with a device that supports the entire edge of the glass sheet. Thus the thermal profile of the glass sheet as it is being heated or cooled can remain more uniform throughout the thermal treatment process.

In one aspect, the glass sheets can each comprise a quality area that is spaced from the perimeter or outer edges of the glass sheet. Conversely, there can be a space between the edge and the quality area that comprises a non-quality area. For example, it is common in LCD glass sheets to have a non-quality area that extends inwardly from the glass sheet edges at a distance of about 0 mm to about 25 mm, although other distances are known in the art. In some applications, it is contemplated that only the non-quality area of the glass sheet is configured to be contacted, if at all, by the separation combs. Thus, the separation combs can be sized and shaped so that the quality area is not contacted.

The method can further comprise placing a second separation comb along the first edge of the glass sheet at a spaced distance from the first separation comb. As described above, in some aspects, a plurality of separation combs can be arranged at a spaced distance from each other in a substantially linear array. In such aspects, the longitudinal axes of the separation combs can be substantially parallel to each other and corresponding channels of each respective separation comb can substantially lie in a common plane. An exemplary linear array is illustrated in FIG. 14. Optionally, the separation combs can be arranged at a spaced distance from each other in an arcuate array. In an arcuate array, the longitudinal axes can be substantially parallel to each other and corresponding channels of each respective separation comb can substantially lie in a common arcuate plane. An exemplary arcuate array is illustrated in FIG. 15.

Positioning the separation combs along a first edge of the glass sheets can comprise first arranging the combs in a linear array and positioning the glass sheets in corresponding channels. Positioning can then comprise moving the combs from a linear array to an arcuate array prior to or during the heat treating process. In one aspect, whether the glass sheets are positioned in the combs of an arcuate array initially, or whether the arcuate array is arranged after receiving the glass sheets, the method can comprise heating the glass sheets sufficiently to cause the glass sheets to assume a profile corresponding to the common arcuate plane of the arcuate array.

Several separation combs can be arranged (such as, but not limited to, in a linear or arcuate array) and connected to each other via connector means to form a comb frame. Thus, one edge of a glass sheet can be supported by one comb frame. A second comb frame can be formed by a second plurality of separation combs and can be used to support a second edge of the glass sheet. In a further aspect, several comb frames can be connected to each other to form a frame that supports substantially each edge of the glass sheet.

In yet another aspect, an exemplary device can comprise one or more elongate separating rods that are configured to be positioned between adjacent glass sheets in a direction substantially parallel to a plane defined by each of the glass sheets. The method can further comprise positioning the at least one separating rod between at least two adjacent glass sheets. The separating rod can be positioned proximate a first edge of the glass sheets, such as in a direction that is substantially parallel to a plane defined by each of the glass sheets. Additional separating rods can be positioned proximate additional edges of the glass sheets, such as described above. In one aspect, the separating rod is positioned proximate an edge of a glass sheet, but does not contact the edge, resulting in less of an impact on the thermal profile along the edge as compared with a device that supports the entire edge of the glass sheet. In various aspects, a combination of separation combs and separating rods can be provided to separate a plurality of glass sheets.

The method, in further aspects, comprises placing the device into an oven. The oven can be operated to heat each of the glass sheets positioned within the device. The glass sheets can be heated by convection in one aspect. Optionally, the glass sheets can be heated by radiation or by a combination of radiation and convection.

Lastly, it should be understood that while the present invention has been described in detail with respect to certain illustrative and specific embodiments thereof, it should not be considered limited to such, as numerous modifications are possible without departing from the broad spirit and scope of the present invention as defined in the appended claims.

The invention claimed is:

1. A method for heat treating a plurality of glass sheets for display substrates each comprising at least a respective upper edge and an opposing bottom edge, comprising:
   placing the plurality of glass sheets within a device wherein the device comprises:
      a support frame; and
      means for separating each of the glass sheets to prevent adjacent sheets from touching, wherein the means for separating comprises at least one elongate separating rod having a proximal portion and an opposing distal portion and at least one upper separation comb comprising:
         an upper comb base defining a longitudinal axis; and
         a plurality of upper comb projections spaced apart along the upper comb base and projecting outwardly from the upper comb base in a direction substantially transverse to the longitudinal axis, wherein each upper comb projection comprises a proximal end and a spaced distal end, wherein adjacent upper comb projections define an upper comb channel therebetween, and wherein each upper comb channel is configured to receive a portion of the upper edge of a respective glass sheet;
   positioning the at least one upper separation comb along at least the upper edges of the glass sheets such that the glass sheet is maintained in a substantially vertical flat plane;
   positioning the at least one elongate separating rod between at least two adjacent glass sheets proximate the bottom edges of the respective adjacent glass sheets in a direction substantially parallel to a plane defined by each of the glass sheets;
   placing the device into an oven; and
   operating the oven to heat each of the plurality of glass sheets.

2. The method of claim 1, wherein the step of positioning the at least one upper separation comb comprises positioning a first upper separation comb at a spaced distance along the upper edges of the glass sheet from a second upper separation comb.

3. The method of claim 1, wherein the at least one upper separation comb comprises a plurality of upper separation combs, wherein the method further comprises arranging the plurality of upper separation combs at a spaced distance from each other in a substantially linear array, wherein the longitudinal axes of each of the upper separation combs are substantially parallel to each other and corresponding upper comb channels of each respective upper separation comb lie in a common plane.

4. The method of claim 1, wherein means for separating further comprises at least one lower separation comb comprising:
   a lower comb base; and
   a plurality of lower comb projections spaced apart along the lower comb base and projecting outwardly from the lower comb base in a direction substantially transverse to the longitudinal axis, wherein each lower comb projection comprises a proximal end and a spaced distal end, wherein adjacent lower comb projections define a lower channel therebetween, and wherein each lower channel is configured to receive a portion of the lower edge of a respective glass sheet;

and the method further comprises:
   positioning the at least one lower separation comb along at least the lower edges of the glass sheets such that the glass sheet is maintained substantially in a vertical flat plane.

5. The method of claim 4, wherein the at least one lower separation comb comprises a plurality of lower separation combs, and the method further comprises arranging the plurality of lower separation combs at a spaced distance from each other in a substantially linear array, wherein the longitudinal axes of each of the lower separation combs are substantially parallel to each other and corresponding lower comb channels of each respective lower separation comb substantially lie in a common plane.

6. A method for heat treating a plurality of glass sheets for display substrates each comprising at least a respective bottom edge and an opposing upper edge, comprising:
   placing the plurality of glass sheets within a device, wherein the device comprises:
      a support frame; and
      means for separating each of the glass sheets to prevent adjacent sheets from touching, comprising at least two upper elongate separating rods each having a proximal portion and an opposing distal portion, wherein the upper elongate separating rods are configured to be positioned between at least two adjacent glass sheets in a direction substantially parallel to a plane defined by each of the glass sheets, and wherein the upper elongate separating rods are configured to be positioned proximate at least the upper edges of respective adjacent glass sheets;
   positioning the upper elongate separating rods between adjacent glass sheets proximate the upper edges of the respective adjacent glass sheets in a direction substantially parallel to a plane defined by each of the glass sheets such that the adjacent upper elongate separating rods define an upper slot restraining the upper edge of a glass sheet and the glass sheet is maintained substantially in a vertical plane;
   placing the device into an oven; and
   operating the oven to heat each of the plurality of glass sheets.

7. The method of claim 6, wherein the device further comprises means for supporting the upper elongate separating rods, comprising:
   a first support structure comprising at least one channel for receiving the proximal portion of the upper elongate separating rods; and
   a second support structure comprising at least one channel for receiving the distal portion of the upper elongate separating rods.

8. The method of claim 6, wherein the means for separating further comprises at least one separation comb comprising:
   a comb base defining a longitudinal axis; and
   a plurality of projections spaced apart along the comb base and projecting outwardly from the comb base in a direction substantially transverse to the longitudinal axis, wherein each projection comprises a proximal end and a spaced distal end, and
wherein adjacent projections define a channel therebetween, and
wherein the method further comprises positioning one glass sheet in each respective channel, and wherein each channel receives a portion of the bottom edge of a respective glass sheet.

9. The method of claim 8, wherein the plurality of projections are spaced apart along the comb base at a predetermined distance that is at least as wide as a thickness of each glass sheet.

10. The method of claim 8, wherein each projection is substantially "T" shaped, wherein the proximal ends of the projections are spaced apart at a first distance and the distal ends of the projections are spaced apart at a second distance, and wherein the first distance is greater than the second distance.

11. The method of claim 10, wherein the second distance is at least as wide as the thickness of each sheet of glass.

12. The method of claim 8, wherein the at least one separation comb comprises a plurality of separation combs, and wherein the plurality of separation combs are configured to be spaced apart from each other along at least the bottom edges of the glass sheets, and wherein the longitudinal axes of each comb base are substantially parallel to each other.

13. The method of claim 12, further comprising connecting each of the plurality of separation combs via connector means to at least one other separation comb to form a comb frame.

14. The method of claim 13, wherein the step of connecting the plurality of separation combs comprises connecting separation combs in a linear array wherein corresponding channels of each of the plurality of separation combs lie substantially in a common plane.

15. The method of claim 6, wherein the means for separating further comprises at least two lower elongate separate rods each having a proximal portion and an opposing distal portion, wherein the lower elongate separating rods are configured to be positioned between at least two adjacent glass sheets in a direction substantially parallel to a plane defined by each of the glass sheets, and wherein the lower elongate separating rods are configured to be positioned proximate at least the lower edges of respective adjacent glass sheets; and the method further comprises:
   positioning the lower elongate separating rods between adjacent glass sheets proximate the bottom edges of the respective adjacent glass sheets in a direction substantially parallel to a plane defined by each of the glass sheets such that the adjacent lower elongate separating rods define a slot restraining the lower edge of a glass sheet and the glass sheet is maintained substantially in a vertical flat plane.

* * * * *